United States Patent
Wang et al.

(10) Patent No.: US 12,469,920 B2
(45) Date of Patent: Nov. 11, 2025

(54) BATTERY MODULE

(71) Applicant: Ningde Amperex Technology Limited, Ningde (CN)

(72) Inventors: Pengfei Wang, Dongguan (CN); Jinbing Zhou, Dongguan (CN)

(73) Assignee: Ningde Amperex Technology Limited, Ningde (CN)

( * ) Notice: Subject to any disclaimer, the term of this patent is extended or adjusted under 35 U.S.C. 154(b) by 615 days.

(21) Appl. No.: 17/460,914

(22) Filed: Aug. 30, 2021

(65) Prior Publication Data

US 2022/0021064 A1    Jan. 20, 2022

Related U.S. Application Data

(63) Continuation of application No. PCT/CN2021/074500, filed on Jan. 29, 2021.

(30) Foreign Application Priority Data

Jul. 17, 2020   (CN) .......................... 202010694761.7

(51) Int. Cl.
*H01M 50/264*   (2021.01)
*H01M 10/44*   (2006.01)
(Continued)

(52) U.S. Cl.
CPC ....... *H01M 50/264* (2021.01); *H01M 10/441* (2013.01); *H01M 50/209* (2021.01); *H01M 50/244* (2021.01)

(58) Field of Classification Search
CPC ............. H01M 50/264; H01M 50/209; H01M 50/244; H01M 10/441
See application file for complete search history.

(56) References Cited

U.S. PATENT DOCUMENTS 4,020,244 A * 4/1977 Selinko ............... H01M 50/209
                                                    429/100
6,040,072 A * 3/2000 Murphy .................... C25B 9/70
                                                    429/470
(Continued)

FOREIGN PATENT DOCUMENTS

CN        201893394 U  *  7/2011
CN        203690376 U     7/2014
(Continued)

OTHER PUBLICATIONS

Machine English translation of CN 201893394 U (Year: 2011).*
(Continued)

*Primary Examiner* — Matthew T Martin
*Assistant Examiner* — Katherine N Higgins
(74) *Attorney, Agent, or Firm* — Maier & Maier, PLLC

(57) ABSTRACT

A battery module includes a cell assembly, where a cell in the cell assembly includes a cell body and a tab; and the battery module further includes: a first fastening band, configured to enclose the cell assembly in a thickness direction of the cell; and a second fastening band, configured to enclose the cell assembly in the thickness direction of the cell, where in a length direction of the cell, a distance between a projection location of the first fastening band and a first end of the cell body is less than or equal to L/4, a distance between a projection location of the second fastening band and a second end of the cell body is less than or equal to L/4, and L is length of the cell body.

14 Claims, 11 Drawing Sheets

(51) Int. Cl.
*H01M 50/209* (2021.01)
*H01M 50/244* (2021.01)

(56) References Cited

U.S. PATENT DOCUMENTS

| | | | |
|---|---|---|---|
| 7,858,224 | B2 | 12/2010 | Kim et al. |
| 2006/0093890 | A1* | 5/2006 | Steinbroner .......... H01M 8/248 429/511 |
| 2011/0064992 | A1* | 3/2011 | Kim .................... H01M 50/209 429/153 |
| 2013/0209853 | A1* | 8/2013 | Gendlin .............. H01M 10/613 429/100 |
| 2014/0087231 | A1 | 3/2014 | Schaefer et al. |
| 2014/0113171 | A1 | 4/2014 | Schaefer |
| 2021/0328301 | A1* | 10/2021 | Chen ................... H01M 50/249 |

FOREIGN PATENT DOCUMENTS

| | | | | |
|---|---|---|---|---|
| CN | 205881954 | U | * | 1/2017 |
| CN | 207038585 | U | | 2/2018 |
| CN | 108735938 | A | * | 11/2018 .......... H01M 2/1016 |
| CN | 209401693 | U | | 9/2019 |
| CN | 209804785 | U | * | 12/2019 |
| CN | 111003236 | A | | 4/2020 |
| CN | 211017198 | U | * | 7/2020 ........ H01M 10/0481 |
| CN | 111785872 | A | | 10/2020 |
| CN | 111916600 | A | | 11/2020 |
| DE | 102011013618 | A1 | * | 9/2012 .............. H01G 4/224 |
| DE | 102016106620 | A1 | * | 10/2016 .............. B60L 50/50 |
| EP | 3800704 | A1 | | 4/2021 |
| EP | 3883045 | A1 | | 9/2021 |
| JP | 2007073509 | A | | 3/2007 |
| KR | 20060082302 | | * | 7/2006 |
| WO | 2020140653 | A1 | | 7/2020 |

OTHER PUBLICATIONS

Machine English translation of CN 205881954 U (Year: 2017).*
Machine English translation of CN 209804785 U (Year: 2019).*
Machine English translation of KR 20060082302 A (Year: 2006).*
Machine English translation of DE-102011013618-A1 (Year: 2012).*
Machine English translation of CN-108735938-A (Year: 2018).*
English Machine Translation for DE 102016106620 A1 (Year: 2016).*
English Machine Translation for CN-201893394-U (Year: 2011).*
English Machine Translation for CN-205881954-U (Year: 2017).*
English Machine Translation for CN-209804785-U (Year: 2019).*
English Machine Translation for CN-211017198-U (Year: 2020).*
Office Action issued on Jun. 6, 2023, in corresponding Japanese Application No. 2021-517756, 12 pages.
Office Action issued on Jan. 9, 2024, in corresponding Japanese Application No. 2021-517756, 5 pages.
Office Action issued on Dec. 6, 2022, in corresponding Japanese Application No. 2021-517756, 12 pages.
Office Action issued on Jan. 9, 2023, in corresponding European Application No. 21754886.6, 43 pages.
Extended Search Report issued on May 2, 2022, in corresponding European Application No. 21754886.6, 7 pages.
Office Action issued on Dec. 22, 2022, in corresponding Australian Application No. 2021202555, 4 pages.
Office Action issued on Apr. 26, 2022, in corresponding Australian Application No. 2021202555, 8 pages.
Office Action issued on Sep. 30, 2022, in corresponding Australian Application No. 2021202555, 5 pages.

* cited by examiner

BATTERY MODULE

CROSS REFERENCE TO THE RELATED APPLICATIONS

The present application is a continuation of PCT international application PCT/CN2021/074500 filed on 29 Jan. 2021, which claims the benefit of priority from the Chinese Patent Application NO. 202010694761.7 filed on 17 Jul. 2020, the disclosure of which is hereby incorporated by reference in its entirety.

TECHNICAL FIELD

This application relates to the field of new energy, and in particular, to a battery module.

BACKGROUND

Battery modules are widely applied in various aspects of life, with a wide range of application scenarios. During use of a battery module, its volume expands after charge and discharge cycling, degrading its cycle performance. A common solution in the industry is to pressurize the battery module. However, there is a problem of pressurization equilibrium in the existing solution. In a conventional pressurization manner, after a battery module expands, various parts of the battery module are under unequilibrated external pressure. With no precise pressure control, different magnitudes of pressure are acting on different areas of the battery module, bringing adverse effects on its electrical cycle performance. Moreover, the existing solution is also subject to the problem of short-circuiting cells or failure caused by displacement of fastening assemblies.

Persons skilled in the art need to consider how to resolve the foregoing problems.

SUMMARY

To resolve the problem in the prior art, this application provides a battery module. The battery module includes a cell assembly, where a cell in the cell assembly includes a cell body and a tab; and the battery module further includes: a first fastening band, configured to enclose the cell assembly in a thickness direction of the cell; and a second fastening band, configured to enclose the cell assembly in the thickness direction of the cell, where in a length direction of the cell, a distance between a projection location of the first fastening band and a first end of the cell body is less than or equal to L/4, a distance between a projection location of the second fastening band and a second end of the cell body is less than or equal to L/4, and L is length of the cell body.

The fastening band is provided to apply a pressure to the cell assembly, so that expansion of the cell assembly during a charge and discharge cycle is limited, which can improve cycle performance of the battery module.

In a first possible implementation, with reference to the foregoing battery module, the distance between the projection location of the first fastening band and the first end of the cell body is greater than or equal to 2 L/25. This value is selected, to prevent a middle region of the cell assembly from being subject to an excessively large pressure.

With reference to the first possible implementation, in a second possible implementation, the distance between the projection location of the second fastening band and the second end of the cell body is greater than or equal to 2 L/25.

With reference to the first and second possible implementations, in a third possible implementation, the battery module further includes a housing, where the housing includes a casing, and the casing is provided between the fastening bands and the cell assembly. A value is selected for a preset region, to prevent an outer region of the cell assembly from being subject to an excessively large pressure.

With reference to the first to third possible implementations, in a fourth possible implementation, the battery module further includes an end plate, where the end plate is provided between an outermost cell of the cell assembly and the fastening bands in a stacking direction of the cell.

With reference to the first to fourth possible implementations, in a fifth possible implementation, grooves are provided on an outer surface of the casing, the casing includes a first surface and a second surface that are facing away from each other, and the grooves are formed on the first surface and the second surface.

With reference to the first to fifth possible implementations, in a sixth possible implementation, a part of the fastening band that is in contact with the casing is provided in the groove. The groove may be configured to limit movement of the fastening band, to prevent the fastening band from shifting due to the expansion of the battery module.

With reference to the first to sixth possible implementations, in a seventh possible implementation, a quantity of the fastening bands is two, the two fastening bands are spaced apart from each other, the grooves include a first sub-groove, a second sub-groove, a third sub-groove, and a fourth sub-groove, the first sub-groove and the second sub-groove are formed on the first surface, the third sub-groove and the fourth sub-groove are formed on the second surface, one of the fastening bands is provided in the first sub-groove and the third sub-groove, and the other fastening band is provided in the second sub-groove and the fourth sub-groove. The two fastening bands spaced apart from each other can make the pressure applied to the cell assembly more equilibrium.

With reference to the first to seventh possible implementations, in an eighth possible implementation, the battery module further includes an end plate, where the end plate is provided between an outermost cell of the cell assembly and the fastening band in a stacking direction of the cell. An end plate is provided between the fastening band and the casing, and the end plate can enhance a pressure resistance capability of the casing, thereby preventing the casing from damage due to an excessively large pressure.

With reference to the first to eighth possible implementations, in a ninth possible implementation, the casing further includes a third surface and a fourth surface that are facing away from each other, where the end plate is in contact with the third surface and the fourth surface; and the casing further includes at least two accommodating grooves, where the at least two accommodating grooves are formed on the third surface and the fourth surface, and the end plate is provided in the accommodating grooves. The end plate is provided in the accommodating groove, to prevent the end plate from being dislocated due to the expansion of the battery module.

With reference to the first to ninth possible implementations, in a tenth possible implementation, the casing further includes a first sub-casing and a second sub-casing, where the first sub-casing and the second sub-casing are buckled to form the casing, a first surface is provided on the first sub-casing, and a second surface is provided on the second sub-casing; and the casing further includes a fifth surface and a sixth surface, where a buckling face of the first sub-casing and the second sub-casing separates the third surface, the fourth surface, the fifth surface, and the sixth surface, the accommodating groove includes a first branch groove and a second branch groove, the first branch groove is provided on the first sub-casing, and the second branch groove is provided on the second sub-casing. Buckling of the first sub-casing and the second sub-casing can make the casing and the cell assembly easier to install in the installation process.

With reference to the first to tenth possible implementations, in an eleventh possible implementation, the fastening band includes at least one pressure adjustment unit, and the pressure adjustment unit is configured to adjust the pressure applied by the fastening band to the casing. The pressure adjustment unit is provided, to implement precise fine adjustment of the pressure applied by the fastening band to the cell assembly.

With reference to the first to eleventh possible implementations, in a twelfth possible implementation, the pressure adjustment unit includes a bolt and a nut, and a torque applied to the bolt is greater than or equal to 1.5 NM.

With reference to the first to twelfth possible implementations, in a thirteenth possible implementation, the fastening band is strip-shaped, the fastening band includes a first adjustment portion and a second adjustment portion that are spaced apart from each other, the pressure adjustment unit is in adjustable connection with the first adjustment portion and the second adjustment portion, and the pressure adjustment unit adjusts the pressure applied by the fastening band to the casing by adjusting a distance between the first adjustment portion and the second adjustment portion.

With reference to the first to thirteenth possible implementations, in a fourteenth possible implementation, a value of the pressure applied by the fastening band to the casing is in a range of 0 kgf to 100 kgf, so that pressure applied to the cell assembly falls within an appropriate range, thereby effectively improving cycle performance of the battery module.

With reference to the first to fourteenth possible implementations, in a fifteenth possible implementation, a sum of areas of cross-sections of the fastening bands is greater than or equal to 60 mm$^2$, thereby ensuring the fastening band has enough strength.

With reference to the first to fifteenth possible implementations, in a sixteenth possible implementation, the housing further includes a front cover and a control circuit, where the front cover is buckled at an end of the casing, and the control circuit is provided between the end plate and the front cover.

With reference to the first to sixteenth possible implementations, in a seventeenth possible implementation, an installation groove is provided inside the casing, and at least a part of the cell assembly is provided in the installation groove.

Compared with the prior art, in the battery module in this application, the fastening band enclosing the outside of the cell assembly is provided to apply a pressure to the cell assembly, so that expansion of the cell assembly during a charge and discharge cycle is limited, thereby improving cycle performance of the battery module. Further, in the length direction of the cell, at least a part of the fastening band is provided in a preset region, the preset region is from an end of the cell body to a location at a distance of L/4 from the end of the cell body, so that the pressure applied to the battery module is more equilibrium and the electrical cycle performance of the battery module is more greatly improved. Further, the casing is provided between the cell assembly and the fastening band, to avoid possible damage or a short-circuit due to direct contact between the fastening band and the cell assembly. Further, the end plate is provided between the fastening band and the casing, and the end plate can enhance a pressure resistance capability of the casing, thereby preventing the casing from damage due to an excessively large pressure. Further, the fastening band may be provided in the groove of the housing, to prevent the fastening band from shifting due to the expansion of the battery module.

REFERENCE SIGNS OF MAIN COMPONENTS

Figure 1:
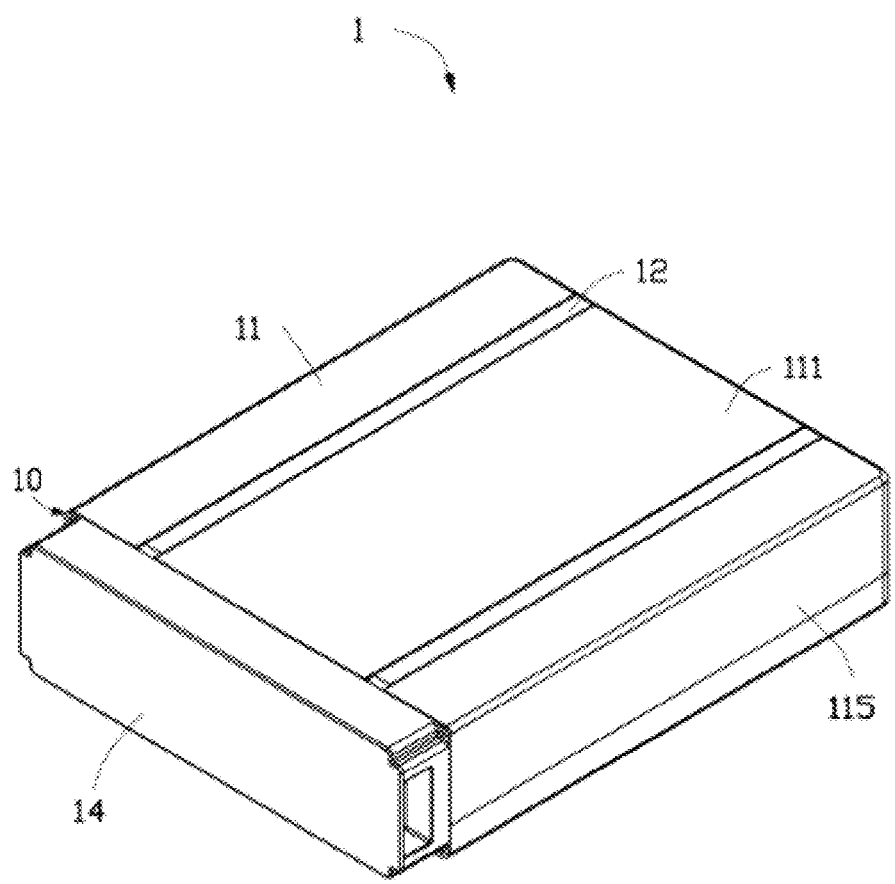
FIG. 1 is a stereoscopic schematic diagram of a battery module according to an embodiment of this application.

Battery module 1
Housing 10
Casing 11
First surface 111

Second surface 112
Third surface 113
Fourth surface 114
Fifth surface 115
Sixth surface 116
Buckling face 117
First sub-casing 118
Second sub-casing 119
Fastening band 12
First fastening band 121
Second fastening band 122
Strap body 120
First adjustment portion 125
Second adjustment portion 126
Pressure adjustment unit 123
End plate 13
Front cover 14
Control circuit 15
Groove 16
First sub-groove 161
Second sub-groove 162
Third sub-groove 163
Fourth sub-groove 164
Installation groove 17
Accommodating groove 18
First branch groove 181
Second branch groove 182
Cell assembly 19
Cell 190
Cell body 191
First end 193
Second end 194
Tab 192
First deformation region 211
Second deformation region 212
Third deformation region 213
Fourth deformation region 221
Fifth deformation region 222
Sixth deformation region 223
Seventh deformation region 231
Eighth deformation region 232
Ninth deformation region 233

This application will be further described with reference to the accompanying drawings in the following specific embodiments.

DESCRIPTION OF EMBODIMENTS

The following more comprehensively describes content of this application with reference to the accompanying drawings. The accompanying drawings show example embodiments of this application. However, this application may be implemented in many different implementations and should not be construed as being limited to the example embodiments illustrated herein. These example embodiments are provided to clearly describe this application, and adequately explain the scope of this application to persons skilled in the art. Similar reference signs represent the same component or similar components.

Terms used herein are only for the purpose of describing specific example embodiments, and are not intended to limit this application. As used herein, unless otherwise clearly stated in the context, singular forms preceded by "a/an", "one", and "the" are also intended to include plural forms. In addition, when used herein, "including" and/or "containing", or "comprising" and/or "involving", or "having" and/or "possessing" an integer, a step, an operation, a component, and/or an assembly do not exclude presence or addition of one or more other features, regions, integers, steps, operations, components, assemblies, and/or groups thereof.

Unless otherwise defined, all terms (including technical and scientific terms) used herein have the same meanings as those commonly understood by persons of ordinary skills in the art to which this application pertains. In addition, unless clearly defined herein, terms defined in general-purpose dictionaries should be construed as having the same meanings as the terms in related technologies and content of this application, and shall not be construed as idealized or extremely formal meanings.

The following content describes the example embodiments with reference to the accompanying drawings. It should be noted that components illustrated in the reference drawings are not necessarily shown to scale; and the same or similar reference signs or similar technical terms are used for the same or similar components.

The embodiments of this application are further described in detail below with reference to the accompanying drawings.

As shown in FIG. 1 to FIG. 8, this application provides a battery module 1, and the battery module 1 includes a cell assembly 19.

Figure 3:
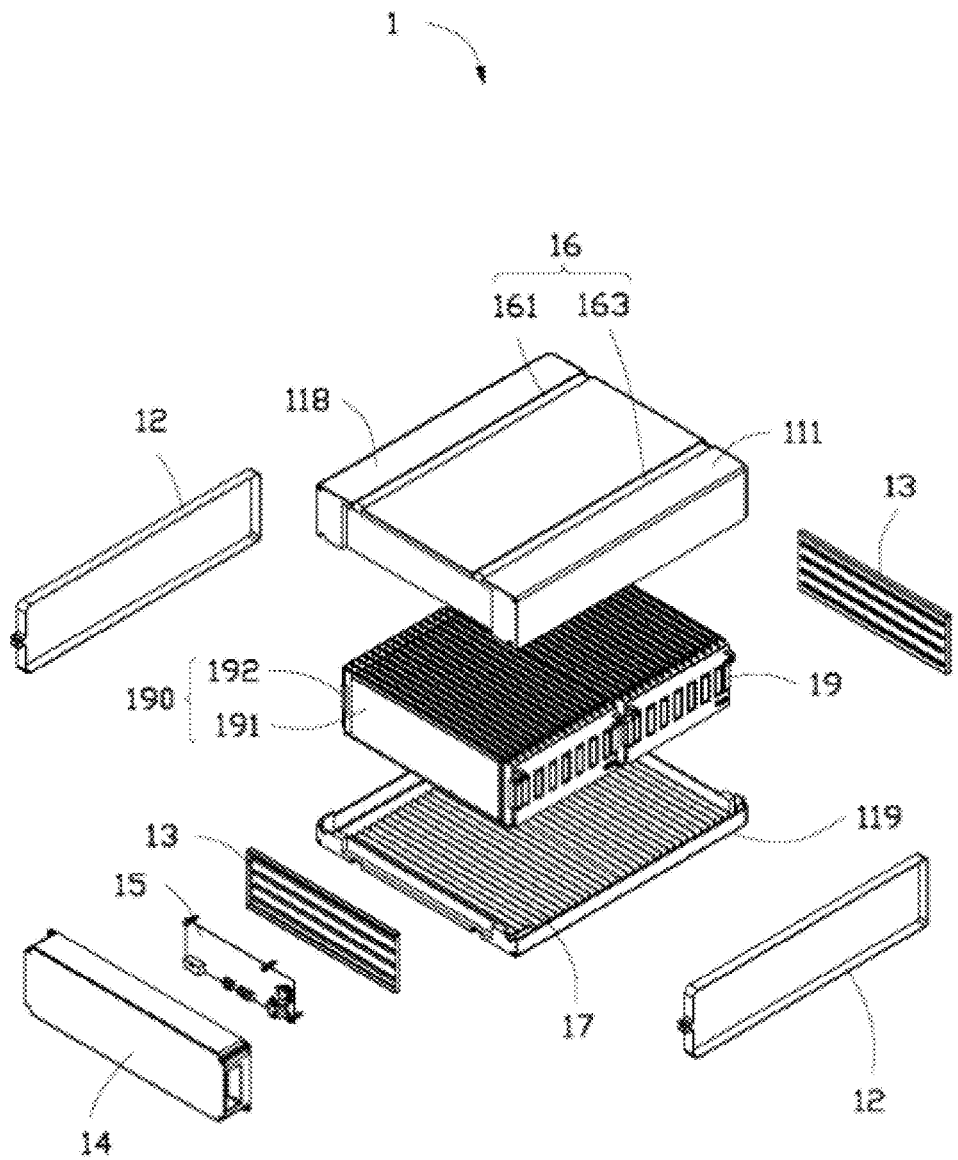
FIG. 3 is a stereoscopic schematic exploded view of a battery module according to an embodiment of this application.

As shown in FIG. 3, the cell assembly 19 includes a plurality of stacked cells 190, each cell 190 includes a plate-shaped cell body 191 and a tab 192, and a plurality of cell bodies 191 are stacked in a thickness direction of the cell body 191. In an embodiment, foam may be provided between the cells 190. Two cell assemblies 19 may be stacked to form a cell entity with larger capacity, and pressurized foam may be provided between two adjacent cell assemblies 19.

In an embodiment, the battery module 1 further includes a fastening band 12, and the fastening band 12 encloses the cell assembly 19 in a thickness direction of the cell 190. In this embodiment, the fastening band 12 may further include an insulation structure. The insulation structure is provided at least between the fastening band 12 and the cell assembly 19, to avoid short-circuiting the cell assembly 19 during pressurization of the fastening band 12.

Figure 2:
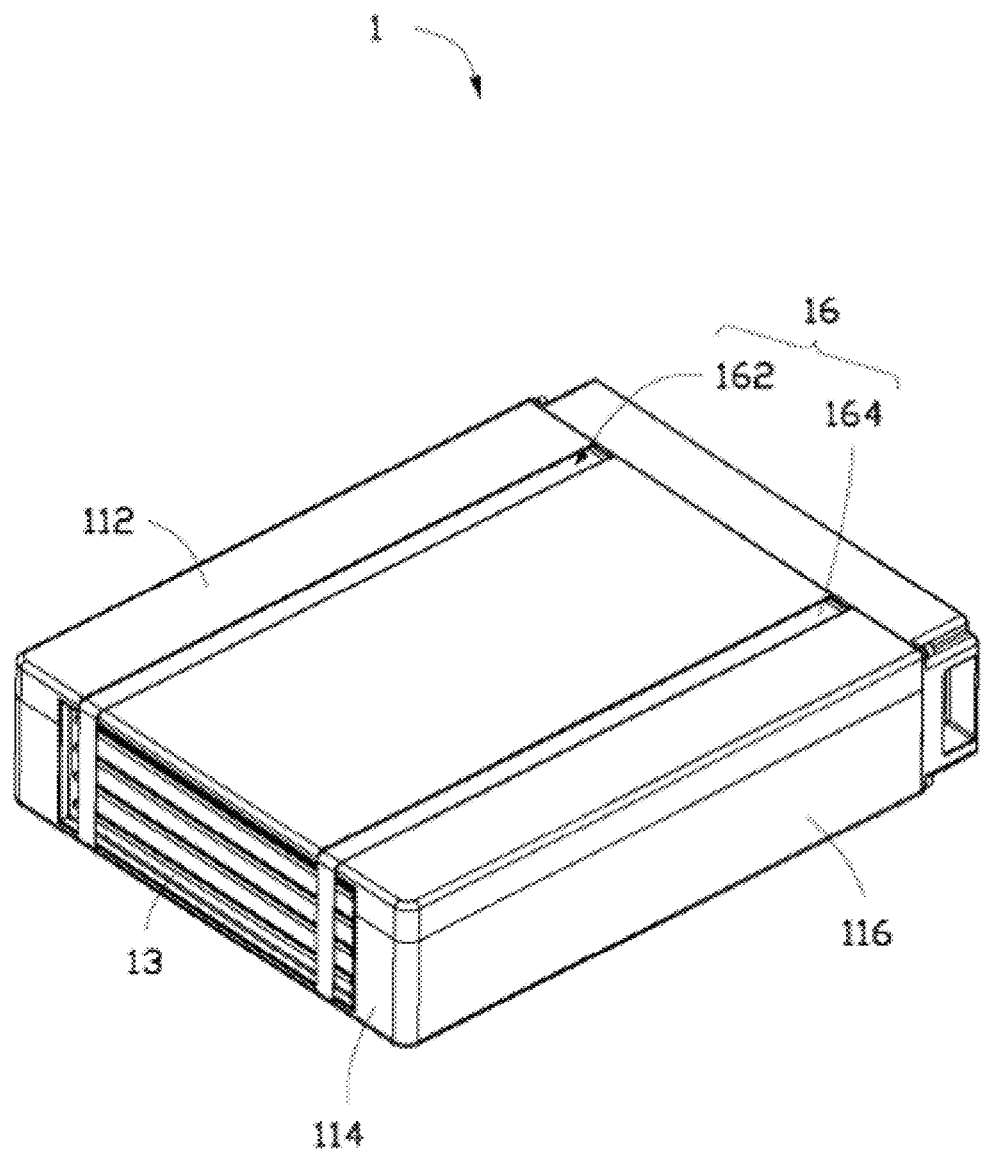
FIG. 2 is a stereoscopic schematic diagram of a battery module according to an embodiment of this application.

In an embodiment, as shown in FIG. 1 to FIG. 3, the battery module 1 further includes a housing 10. The housing 10 includes a casing 11, an end plate 13, a front cover 14, and a control circuit 15. The casing 11 is provided between the fastening band 12 and the cell assembly 19.

In an embodiment, the housing 10 may be formed by integrating a plurality of units, and the casing 11 is connected to the front cover 14. In an embodiment, the casing 11 may be an integral structure; or in other embodiments, the casing 11 may be formed by stacking a plurality of brackets. In this embodiment, the housing 10 may be formed by integrating the plurality of units, the casing 11 is connected to the front cover 14, and the casing 11 may be the integral structure.

The cell assembly 19 is provided inside the casing 11, the fastening band 12 encloses an outside of the casing 11, the end plate 13 is provided on an outer surface of the casing 11, the front cover 14 is buckled on the outside of the casing 11, and the control circuit 15 is provided between the casing 11 and the front cover 14.

Figure 4:
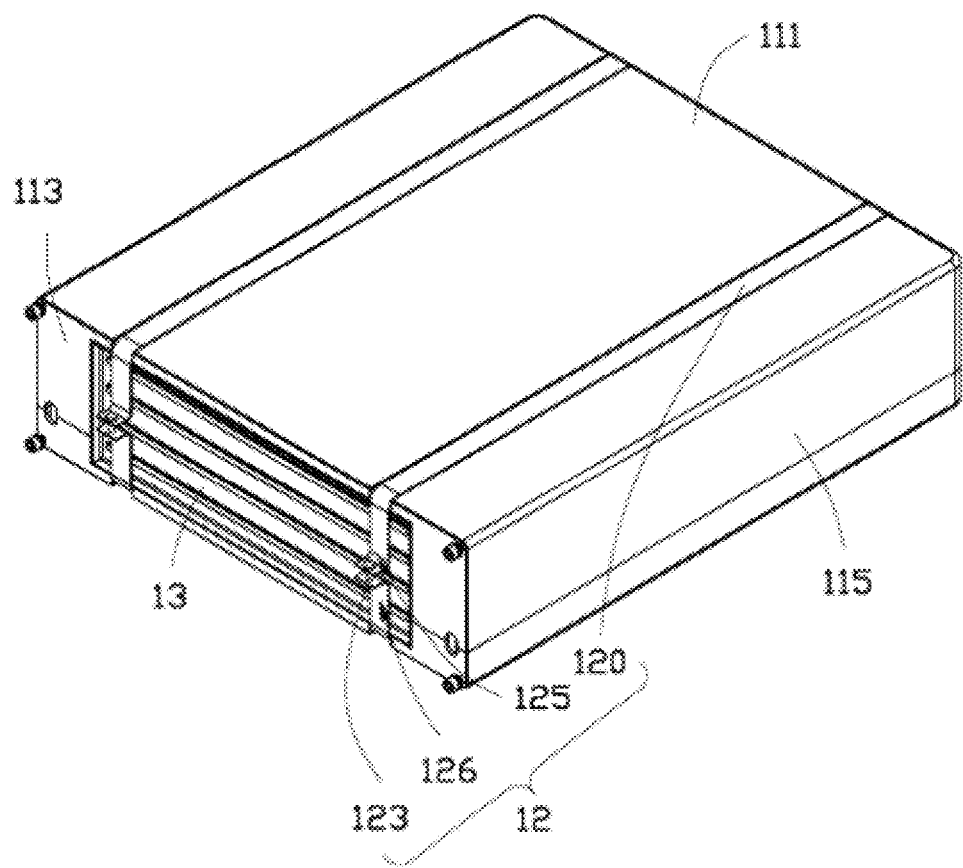
FIG. 4 is a partial stereoscopic schematic diagram of a battery module according to an embodiment of this application.

As shown in FIG. 1, FIG. 2, and FIG. 4, in an embodiment, the casing 11 has roughly a hexahedron structure, and the casing 11 includes a first surface 111, a second surface 112, a third surface 113, a fourth surface 114, a fifth surface 115, and a sixth surface 116. The first surface 111 and the second surface 112 are facing away from each other. The third surface 113 and the fourth surface 114 are facing away from each other. The fifth surface 115 and the sixth surface 116 are facing away from each other. The casing 11 further includes a first sub-casing 118 and a second sub-casing 119, the first sub-casing 118 and the second sub-casing 119 are buckled to form the casing 11, a buckling face 117 of the first sub-casing 118 and the second sub-casing 119 separates the third surface 113, the fourth surface 114, the fifth surface 115, and the sixth surface 116. The first surface 111 is provided on the first sub-casing 118, and the second surface 112 is provided on the second sub-casing 119.

In an embodiment, the first surface 111 and the second surface 112 are corresponding to surfaces formed by a length and a height (thickness) of the cell body 191, the third surface 113 and the fourth surface 114 are corresponding to surfaces formed by the length and a width of the cell body 191, and the fifth surface 115 and the sixth surface 116 are corresponding to surfaces formed by the width and the height (thickness) of the cell body 191.

Figure 5:
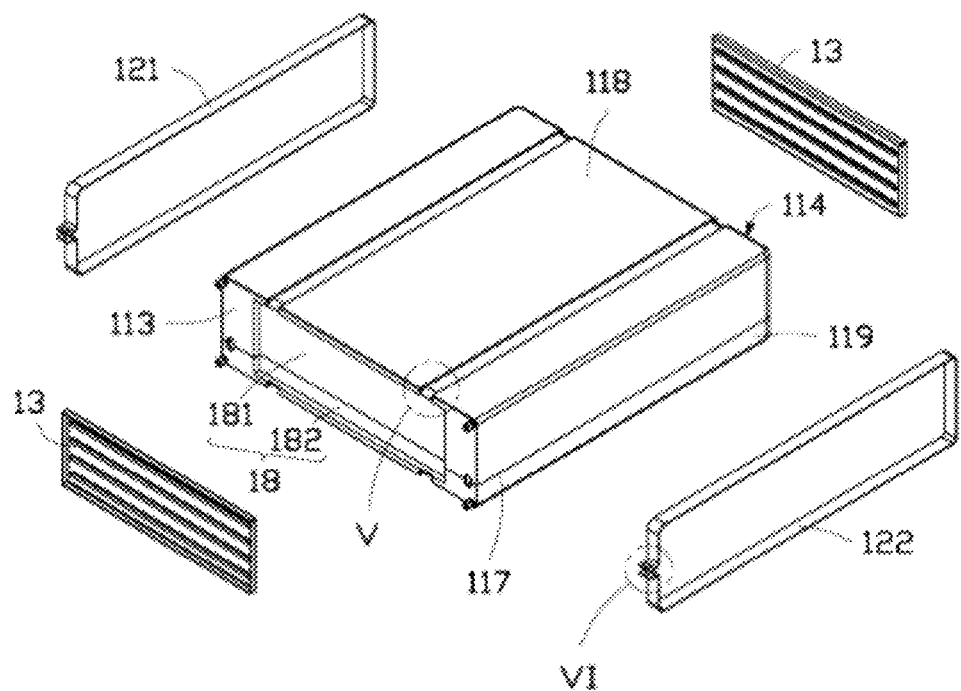
FIG. 5 is a partial stereoscopic schematic exploded view of a battery module according to an embodiment of this application.
Figure 6:
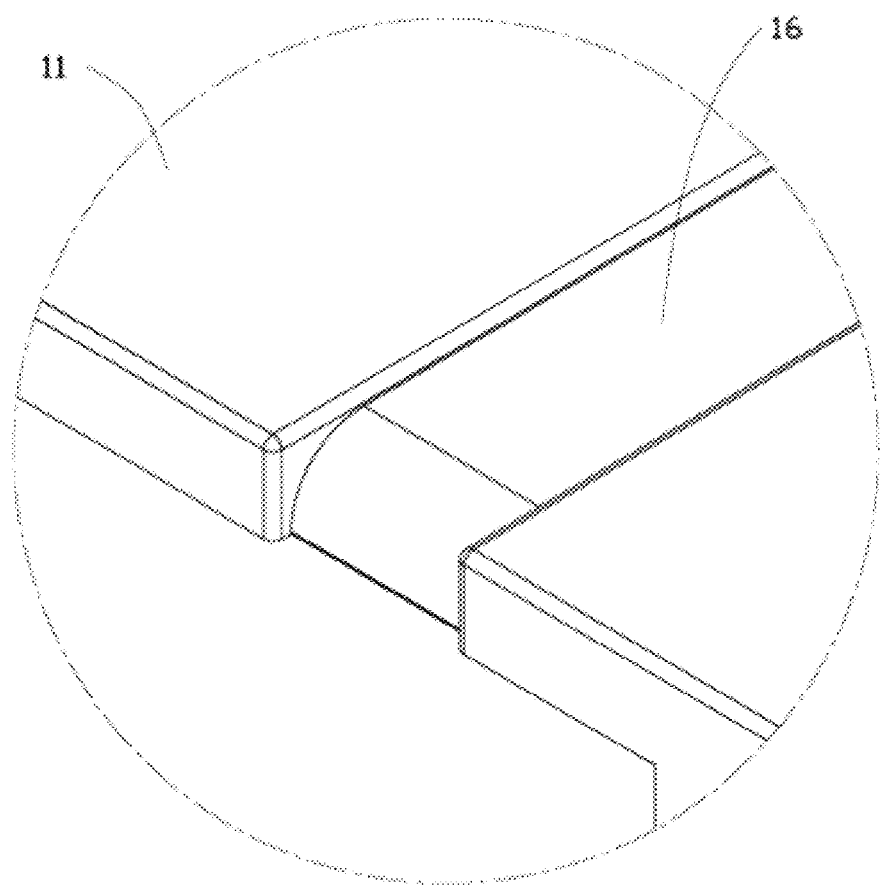
FIG. 6 is an enlarged partial schematic diagram of a battery module according to an embodiment of this application.

As shown in FIG. 5 and FIG. 6, grooves 16 are formed on an outer surface of the casing 11. The grooves 16 are formed by recessing the outer surface of the casing 11 toward the inside of the casing 11. As shown in FIG. 2 and FIG. 3, in an embodiment, the grooves 16 are formed on the first surface 111 and the second surface 112. The grooves 16 include a first sub-groove 161, a second sub-groove 162, a third sub-groove 163, and a fourth sub-groove 164. The first sub-groove 161 and the second sub-groove 162 are formed on the first surface 111, and the third sub-groove 163 and the fourth sub-groove 164 are formed on the second surface 112.

The fastening band 12 encloses the outside of the casing 11 in the thickness direction of the cell body 191 (that is, a stacking direction of the plurality of cells 190). The fastening band 12 applies a pressure to the casing 11 to fix the casing 11 and the cell assembly 19, and the fastening band 12 is not in contact with the cell assembly 19 to prevent the cell assembly 19 from damage or a short-circuit during pressurization. A part of the fastening band 12 that is in contact with the casing 11 is provided in the groove 16, and the groove 16 can fix a location of the fastening band 12 to prevent the fastening band 12 from shifting or falling off due to expansion of the battery module 1.

In an embodiment, the fastening band 12 may be a steel strap. In some cases, an insulation structure may be provided on an outside of the steel strap, and the insulation structure may cover a surface of the steel strap.

As shown in FIG. 4, each fastening band 12 includes a strap body 120 and at least one pressure adjustment unit 123. The pressure adjustment unit 123 and the strap body 120 are in adjustable connection so that the strap body 120 forms a circular structure. The pressure adjustment unit 123 is configured to adjust the pressure applied by the fastening band 12 to the casing 11. In this embodiment, the pressure adjustment unit 123 may be a tightening adjustment unit in which a nut and a bolt mutually cooperate. An initial pressure applied by the fastening band to the casing 11 may be adjusted by adjusting a torque when the bolt is tightened. A model of M5, M6, or M8 may be selected for the bolt, and the torque applied to the bolt when tightened is estimated to be within a range of 1.5 NM to 50 NM. In this embodiment, the fastening band 12 includes the steel strap.

In another embodiment, the pressure adjustment unit 123 further includes another type of adjustment unit. In an embodiment, the torque provided by the pressure adjustment unit 123 to the fastening band 12 may be in a range of 1.5 NM to 50 NM. Excessively small torque (for example, less than 1.5 NM) makes the fastening band 12 relatively loosen and unable to apply a pressure after expansion of the cell assembly 19. Excessively large torque (for example, greater than 50 NM) may damage a fastening structure of the fastening band 12, thereby causing invalidation of the structure.

Figure 7:
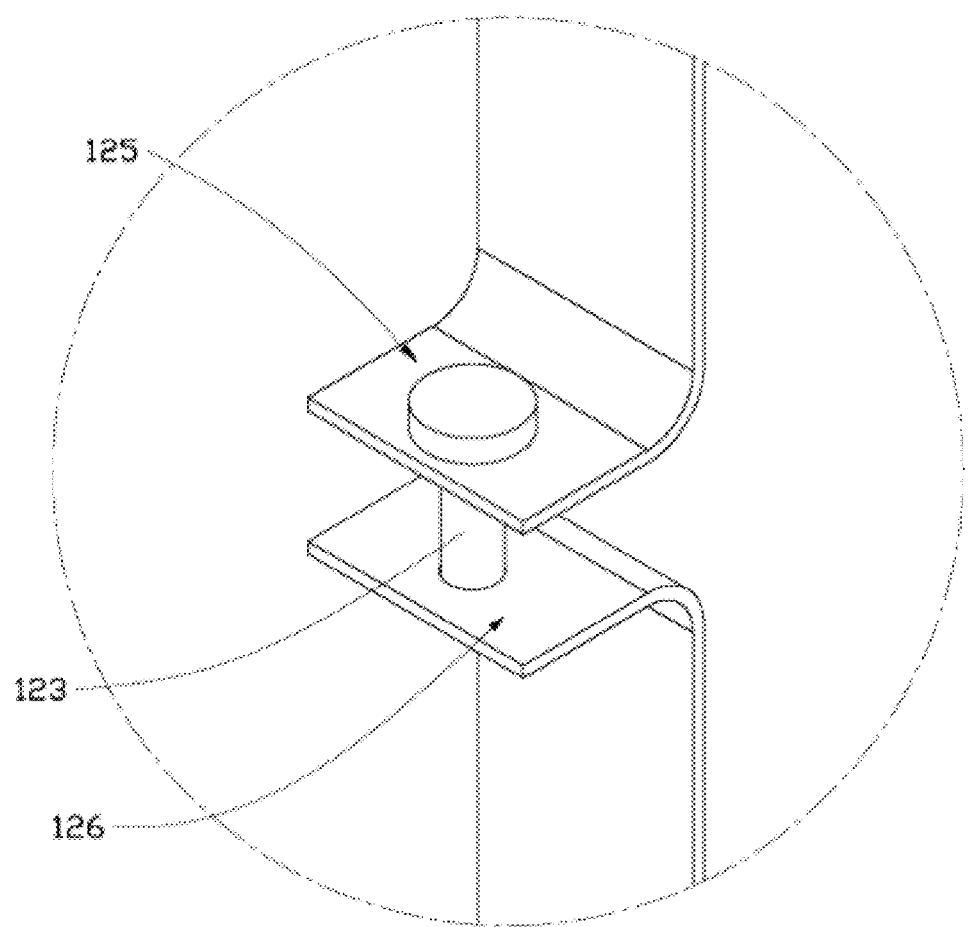
FIG. 7 is an enlarged partial schematic diagram of a battery module according to an embodiment of this application.

As shown in FIG. 7, in an embodiment, the fastening band 12 may be strip-shaped, the fastening band 12 further includes a first adjustment portion 125 and a second adjustment portion 126 that are spaced apart from each other, and the first adjustment portion 125 and the second adjustment portion 126 are located at two ends of the strap body 120. As shown in FIG. 7, in an embodiment, the pressure adjustment unit 123 is in adjustable connection with the first adjustment portion 125 and the second adjustment portion 126, and the pressure adjustment unit 123 adjusts the pressure applied by the fastening band 12 to the casing 11 by adjusting a distance between the first adjustment portion 125 and the second adjustment portion 126. In another embodiment, one fastening band 12 may alternatively be formed by connecting two independent sub-straps through two different pressure adjustment units 123 at two ends.

In an embodiment, a quantity of the fastening bands 12 is two, and each fastening band 12 encloses the first surface 111, the second surface 112, the third surface 113, and the fourth surface 114. The two fastening bands 12 are spaced apart from each other, and the two fastening bands 12 may be separately provided on two sides of the battery module 1. This structure can provide relatively equilibrium pressure support for the battery module 1. One fastening band 12 is provided in the first sub-groove 161 and the third sub-groove 162, and the other fastening band 12 is provided in the second sub-groove 163 and the fourth sub-groove 164. In other embodiments, a quantity of the fastening bands 12 may be more than two, and the plurality of fastening bands 12 may be in contact with each other. For example, the plurality of fastening bands 12 intersect and may be further perpendicular to each other.

In an embodiment, the two fastening bands 12 are the first fastening band 121 and the second fastening band 122, and the first fastening band 121 may have the same structure as the second fastening band 122. The cell body 191 includes a first end 193 and a second end 194. The first end 193 and the second end 194 are provided on two opposite sides of the cell body 191. The first end 193 and the second end 194 may be respectively corresponding to end faces corresponding to a thickness and a width of the cell 190.

In an embodiment, when the battery module 1 is in an initial state that includes a state in a period after the battery module 1 is manufactured and before the battery module 1 is put into actual use, the cell assembly 19 in the battery module 1 in this state does not expand, a value of pressure applied by the fastening band 12 to the casing 11 is in a range of 0 kgf to 100 kgf, and an initial pressure applied by the fastening band 12 to the casing 11 is relatively small. After a charge and discharge cycle of the cell assembly 19 in the battery module 1 starts, the battery module 1 expands, and therefore the pressure applied by the fastening band 12 to the casing 11 increases, thereby enhancing cycle performance of the cell. A total area of cross-sections of the fastening bands 12 is greater than or equal to 60 mm$^2$. In an embodiment, a cross-section of the strap body 120 of the fastening band 12 may be a rectangle with a length of 19 mm and a width of 0.8 mm, and a sum of areas of cross-sections of four fastening bands 12 is greater than 60 mm$^2$. In other embodiments, the fastening band 12 may alternatively be in a shape of a cylinder or the like.

Figure 8:
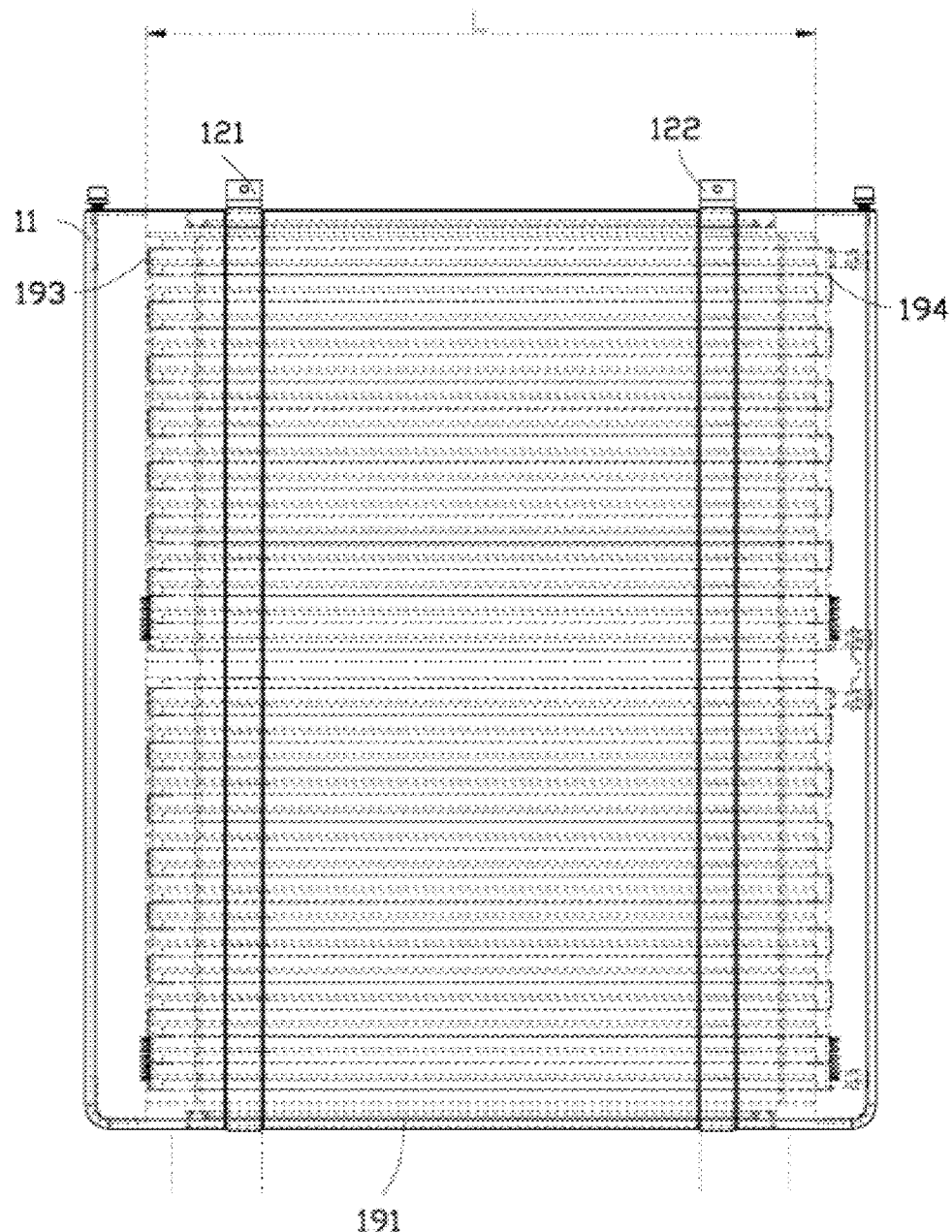
FIG. 8 is a schematic perspective view of a battery module according to an embodiment of this application.

In an embodiment, as shown in FIG. 8, the first fastening band 121 is provided adjacent to the first end 193, and the second fastening band 122 is provided adjacent to the second end 194. In a length direction of the cell 190, a distance between a projection location of the first fastening band 121 enclosing the cell assembly 19 in a length direction of the cell body 191 and a first end 193 of the cell body 191 is less than or equal to L/4 and may be further greater than or equal to 2 L/25; and a distance between a projection location of the second fastening band 122 enclosing the cell assembly 19 in the length direction of the cell body 191 and a second end 194 of the cell body 191 is less than or equal to L/4 and may be further greater than or equal to 2 L/25. L is length of the cell body 191. In an embodiment, the first fastening band 121 and the second fastening band 122 may be symmetrically provided. Specifically, the first fastening band 121 and the second fastening band 122 may be symmetrically provided by using, as an axis of symmetry, a line connecting midpoints of sides corresponding to lengths of the plurality of cells 190 on the same side.

In an embodiment, a midpoint or a midline of a projection or a side edge on the same side of the fastening bands 12 in the length direction of the cell body 191 may be selected as a base point or a baseline for calculating a distance between the projection and the first end 193 or the second end 194 of the cell body 191.

In an embodiment, the grooves 16 for accommodating the fastening band 12 may be correspondingly provided based on a placement location of the fastening band 12.

Figure 9:
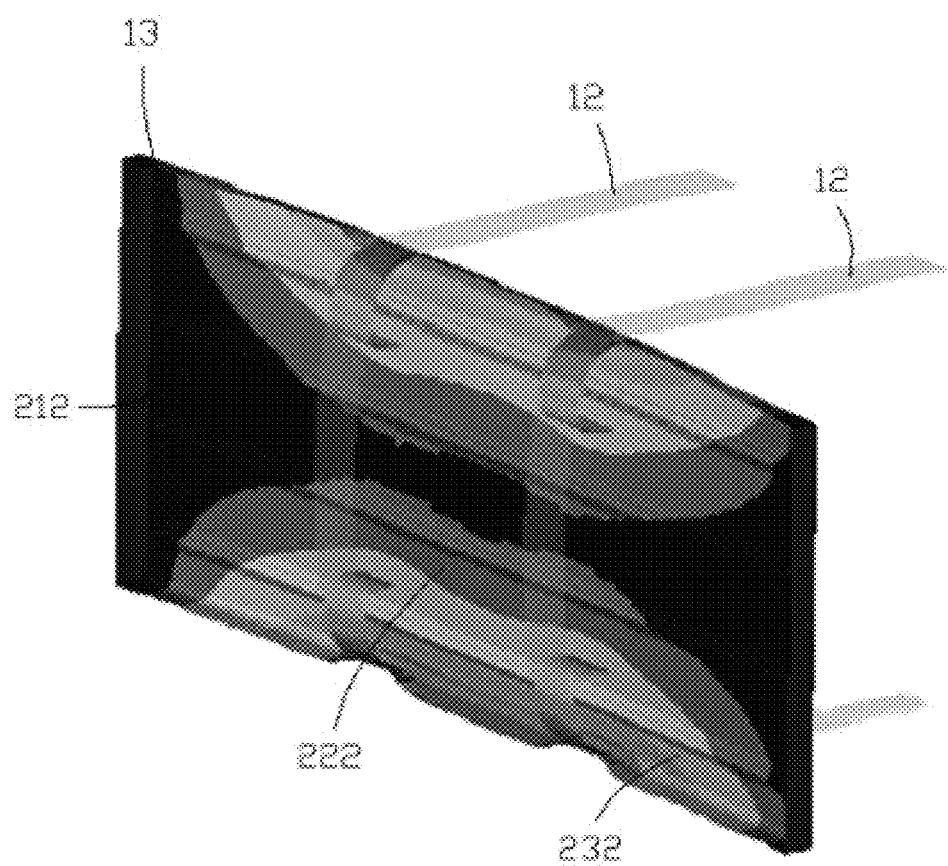
FIG. 9 is a schematic diagram of deformation degree distribution on an end plate when a distance between a projection of a first fastening band of a battery module in a length direction of a cell and a first end is greater than L/4 and a distance between a projection of a second fastening band in the length direction of the cell and a second end is greater than L/4 according to an embodiment of this application.
Figure 10:
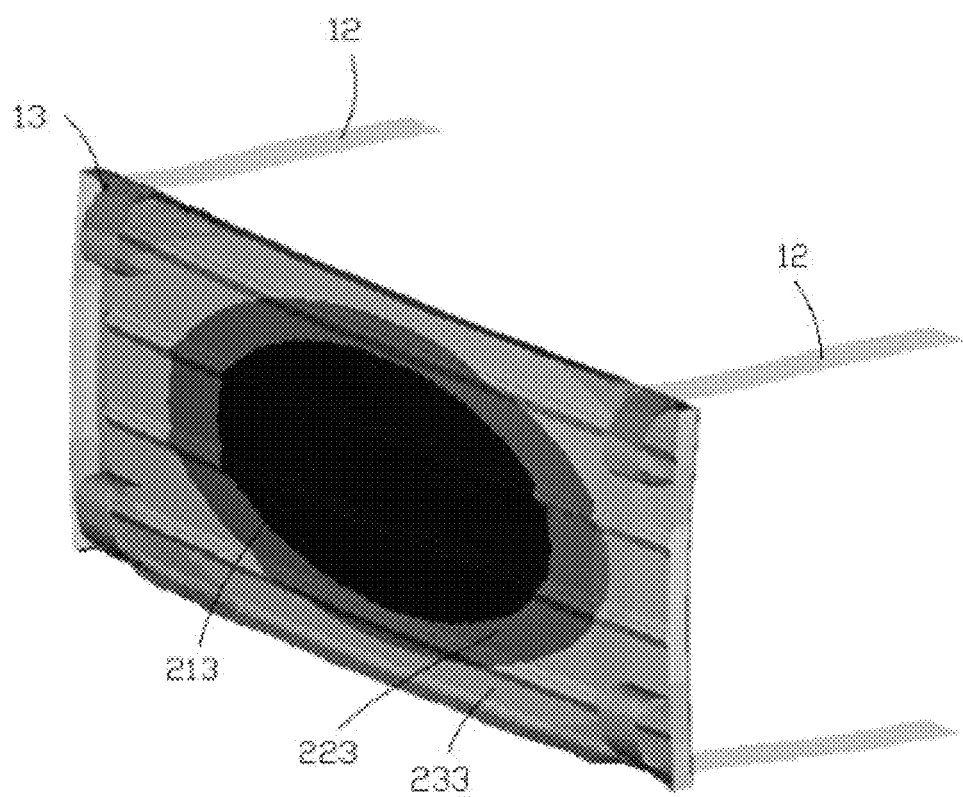
FIG. 10 is a schematic diagram of deformation degree distribution on an end plate when a distance between a projection of a first fastening band of a battery module in a length direction of a cell and a first end is less than 2 L/25 and a distance between a projection of a second fastening band in the length direction of the cell and a second end is less than 2 L/25 according to an embodiment of this application.
Figure 11:
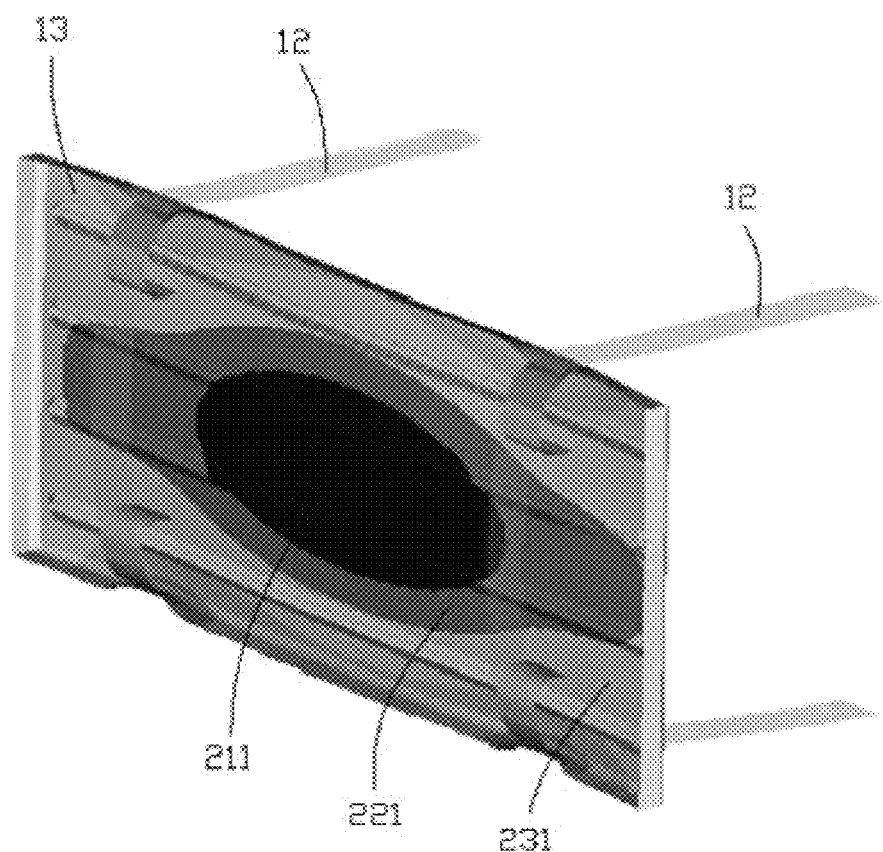
FIG. 11 is a schematic diagram of deformation degree distribution on an end plate when a distance between a projection of a first fastening band of a battery module in a length direction of a cell and a first end is greater than or equal to 2 L/25 and less than or equal to L/4, and a distance between a projection of a second fastening band in the length direction of the cell and a second end is greater than or equal to 2 L/25 and less than or equal to L/4 according to an embodiment of this application.

The end plate 13 is provided between the fastening band 12 and the cell assembly 19. FIG. 9 to FIG. 11 are schematic diagrams of distribution of a degree of deformation of the end plate 13 caused by expansion of the cell assembly 19 after charge and discharge cycling when provided at a different location based on a distance between the projection of the fastening band 12 in the length direction of the cell 190 and the first end 193 or the second end 194.

FIG. 9 is a schematic diagram of deformation degree distribution on the end plate 13 when the distance between the projection of the first fastening band 121 of the battery module 1 in the length direction of the cell 190 and the first end 193 is greater than L/4 and the distance between the projection of the second fastening band 122 in the length direction of the cell 190 and the second end 194 is greater than L/4. In this embodiment, the distance between the projection of the first fastening band 121 in the length direction of the cell 190 and the first end 193 may be, for example, L/3, and the distance between the projection of the second fastening band 122 in the length direction of the cell 190 and the second end 194 may be, for example, L/3. The end plate 13 may be roughly divided into three regions based on deformation degrees. A second deformation region 212 is distributed in a relatively narrow region in the middle of the end plate 13 and edges on two sides of the end plate 13. A fifth deformation region 222 and an eighth deformation region 232 are separated by the second deformation region 212 as two parts. The fifth deformation region 222 and the eighth deformation region 232 gradually evolve and are distributed respectively toward outer edges of upper and lower sides of the end plate 13 and rapidly decrease. A deformation degree of the second deformation region 212 is greater than a deformation degree of the fifth deformation region 222, and a deformation degree of the fifth deformation region 222 is greater than a deformation degree of the eighth deformation region 232. Specifically, a thickness of the cell 190 may be in a range of 9 to 20 mm (for example, 13 mm), a width of the cell 190 may be in a range of 122 to 142 mm, and a length of the cell 190 may be in a range of 265 to 360 mm (for example, 360 mm). In a thickness direction of the end plate 13, when a pressure load is 5 KN, a maximum deformation range of the second deformation region 212 may satisfy that $\delta=5$ mm to 6 mm (a maximum deformation value of two ends may satisfy that $\delta max=5.506$ mm), a maximum deformation range of the fifth deformation region 222 may satisfy that $\delta=3$ mm to 4 mm (specifically, $\delta max=3.75$ mm), and a maximum deformation range of the eighth deformation region 232 may satisfy that $\delta=1$ mm to 2 mm (specifically, $\delta max=1.875$ mm). Deformation degree distribution on the end plate 13 is unequilibrated. A deformation degree of the two ends of the end plate 13 is larger, a pressure applied to the two ends of the end plate 13 is larger, pressure distribution on the end plate 13 is unequilibrated and edge warping occurs, and consequently, pressure distribution on the cell assembly 19 is unequilibrated.

FIG. 10 is a schematic diagram of deformation degree distribution on the end plate 13 when the fastening band 12 of the battery module 1 is provided on an end adjacent to the cell body 191 (refer to FIG. 8). A distance between a first fastening band 121 and an adjacent first end 193 may be the distance between the projection of the first fastening band 121 in the length direction of the cell 190 and the first end 193 that is less than 2 L/25 (for example, L/28), and a distance between a second fastening band 122 and an adjacent second end 194 may be the distance between the projection of the second fastening band 122 in the length direction of the cell 190 and the second end 194 that is less than 2 L/25 (for example, L/28). The end plate 13 may be roughly divided into three regions based on deformation degrees. A third deformation region 213 is distributed in a middle region of the end plate 13. A sixth deformation region 223 and a ninth deformation region 233 gradually evolve and are distributed from the third deformation region 213 to outer edges of the end plate 13. A deformation degree of the third deformation region 213 is greater than a deformation degree of the sixth deformation region 223, and a deformation degree of the sixth deformation region 223 is greater than a deformation degree of the ninth deformation region 233. Specifically, a thickness of the cell 190 may be in a range of 9 to 20 mm (for example, 13 mm), a width of the cell 190 may be in a range of 122 to 142 mm, and a length of the cell 190 may be in a range of 265 to 360 mm (for example, 360 mm). In a thickness direction of the end plate 13, when a pressure load is 5 KN, a maximum deformation range of the third deformation region 213 may satisfy that $\delta=5$ mm to 6 mm (specifically, $\delta max=5.941$ mm), a maximum deformation range of the sixth deformation region 223 may satisfy that $\delta=4$ mm to 5 mm (specifically, $\delta max=4.375$ mm), and a maximum deformation range of the ninth deformation region 233 may satisfy that $\delta=3$ mm to 4 mm (specifically, $\delta max=3.125$ mm). An overall deformation degree of the end plate 13 gradually slowly decreases from a middle region to a peripheral region, and consequently, deformation of the entire end plate 13 changes roughly homogeneously, and a change trend is relatively equilibrium. Correspondingly, pressure distribution on the end plate 13 is relatively equilibrium. Compared with the implementation shown in FIG. 9, in the implementation shown in FIG. 10, the pressure distribution on the end plate 13 is relatively equilibrium, and no edge warping or damage occurs. Correspondingly, the pressure distribution on the cell assembly 19 is relatively equilibrium.

In this embodiment, the quantity of the fastening bands 12 is two, and the two fastening bands 12 are respectively provided on two sides. In other embodiments, the quantity of the fastening bands 12 may be three, among which, two fastening bands 12 are provided on two sides, and one fastening band 12 is provided in a middle region and may further cover a center point of the end plate 13, thereby making the pressure distribution on the end plate 13 more equilibrium.

FIG. 11 is a schematic diagram of deformation degree distribution on the end plate 13 when the distance between the projection of the first fastening band 121 of the battery module 1 in the length direction of the cell 190 and the first end 193 is greater than or equal to 2 L/25 and less than or equal to L/4, and the distance between the projection of the second fastening band 122 in the length direction of the cell 190 and the second end 194 is greater than or equal to 2 L/25 and less than or equal to L/4. In this embodiment, the distance between the projection of the first fastening band 121 in the length direction of the cell 190 and the first end 193 may be L/6, and the distance between the projection of the second fastening band 122 in the length direction of the cell 190 and the second end 194 may be L/6. The end plate 13 may be roughly divided into three regions based on deformation degrees. A first deformation region 211 is distributed in a middle region of the end plate 13. A fourth deformation region 221 and a seventh deformation region 231 gradually evolve and are distributed from the first deformation region 211 to outer edges of the end plate 13. A deformation degree of the first deformation region 211 is greater than a deformation degree of the fourth deformation region 221, and a deformation degree of the fourth deformation region 221 is greater than a deformation degree of the seventh deformation region 231. Specifically, a thickness of the cell 190 may be in a range of 9 to 20 mm (for example, 13 mm), a width of the cell 190 may be in a range of 122 to 142 mm, and a length of the cell 190 may be in a range of 265 to 360 mm (for example, 360 mm). In a thickness direction of the end plate 13, when a pressure load is 5 KN, a maximum deformation range of the first deformation region 211 may satisfy that $\delta=5$ mm to 6 mm (specifically, $\delta max=5.687$ mm), a maximum deformation range of the fourth deformation region 221 may satisfy that $\delta=4$ mm to 5 mm (specifically, $\delta max=4.375$ mm), and a maximum deformation range of the seventh deformation region 231 may satisfy that $\delta=3$ mm to 4 mm (specifically, $\delta max=3.75$ mm). Compared with the implementations shown in FIG. 9 and FIG. 10, in the implementation shown in FIG. 11, deformation degree distribution on the end plate 13 is more equilibrium. That is, the pressure applied to the end plate 13 is more equilibrium. Correspondingly, the pressure distribution on the cell assembly 19 is equilibrium.

The deformation degree of the end plate 13 is positively correlated with the pressure applied to the end plate 13, and the pressure applied to the end plate 13 is also positively correlated with the pressure applied to the cell assembly 19. It can be learned from FIG. 9 that when the distance between the projection of the first fastening band 121 of the battery module 1 in the length direction of the cell 190 and the first end 193 is greater than L/4 and the distance between the projection of the second fastening band 122 in the length direction of the cell 190 and the second end 194 is greater than L/4, deformation degrees of the relatively narrow middle region of the end plate 13 and edge regions on the two sides of the end plate 13 are relatively large, deformation degrees of edges on both the sides of the end plate 13 are excessively large, deformation degrees of edges of regions on the other two sides are excessively small, the pressure applied to the entire end plate 13 is obviously unequilibrated, and distribution on the pressure applied to the cell assembly 19 is obviously unequilibrated. It can be learned from FIG. 10 that when the fastening band 12 is provided at the end adjacent to the cell body 191 (refer to FIG. 8), the distance between the first fastening band 121 and the adjacent first end 193 may be the distance between the projection of the first fastening band 121 in the length direction of the cell 190 and the first end 193 that is less than 2 L/25, and the distance between the second fastening band 122 and the adjacent second end 194 may be the distance between the projection of the second fastening band 122 in the length direction of the cell 190 and the second end 194 that is less than 2 L/25, a deformation degree of the middle region of the end plate 13 is relatively moderate, deformation degree distribution on the edge region is homogeneous, the pressure applied to the entire end plate 13 is relatively equilibrium, and distribution on the pressure applied to the cell assembly 19 is relatively equilibrium. It can be learned from FIG. 11 that when the distance between the projection of the first fastening band 121 in the length direction of the cell 190 and the first end 193 is greater than or equal to 2 L/25 and less than or equal to L/4, and the distance between the projection of the second fastening band 122 in the length direction of the cell 190 and the second end 194 is greater than or equal to 2 L/25 and less than or equal to L/4, a deformation degree of a middle portion of the end plate 13 is relatively high, an area of a region with high deformation in the middle portion of the end plate 13 is moderate, and the deformation degree of the end plate 13 appropriately gradually decreases from the middle portion to an outer region. Compared with the implementation shown in FIG. 10, in the implementation shown in FIG. 11, the pressure applied to the end plate 13 is more equilibrium, and distribution on the pressure applied to the cell assembly 19 is also more equilibrium.

In an embodiment, the end plate 13 may not be provided between the cell assembly 19 and the fastening band 12. In this implementation, the deformation degree, the pressure distribution, and the change trend that are shown in FIG. 9 to FIG. 11 and listed above are corresponding to a deformation degree, pressure distribution, and a change trend of the outermost cell 190 of the cell assembly 19. That is, corresponding to that in the implementation shown in FIG. 9 and FIG. 10, pressure distribution on the outermost cell 190 of the cell assembly 19 is relatively equilibrium, and corresponding to that in the implementation shown in FIG. 11, pressure distribution on the outermost cell 190 of the cell assembly 19 is relatively equilibrium.

The end plate 13 is provided between the fastening band 12 and an outermost side of the casing 11 in the stacking direction of cells 190, and the end plate 13 is in contact with the third surface 113 and the fourth surface 114.

In an embodiment, a material of the end plate 13 may be metal, such as aluminum, or the material of the casing 11 may be an insulation material, such as insulation plastic. The end plate 13 is provided on a side of the casing 11 to prevent the casing 11 from damage during pressurization of the fastening band 12.

As shown in FIG. 3, the casing 11 further includes at least two accommodating grooves 18, and the at least two accommodating grooves 18 are formed on the third surface 113 and the fourth surface 114. In an embodiment, the accommodating groove 18 is formed by recessing the third surface 113 and the fourth surface 114 toward the inside of the casing 11, and the end plate 13 is provided in the accommodating groove 18. The pressure adjustment unit 123 is provided on a side of the end plate 13 away from the casing 11.

In an embodiment, the accommodating groove 18 includes a first branch groove 181 and a second branch groove 182. The first branch groove 181 is provided on the first sub-casing 118, and the second branch groove 182 is provided on the second sub-casing 119.

An installation groove 17 is provided inside the casing 11, and at least a part of the cell assembly 19 is provided in the installation groove 17. In an embodiment, there are a plurality of installation grooves 17, one installation groove 17 is corresponding to one cell body 191, and the cell 190 may be fixed to the casing 11 by using glue provided in the installation groove 17.

The foregoing describes the embodiments of this application with reference to the accompanying drawings. However, persons of ordinary skill in the art can understand that various changes and replacements can be further made to the embodiments of this application without departing from the spirit and the scope of this application.

What is claimed is:

1. A battery module, comprising:
   a cell assembly and a plurality of fastening bands, the cell assembly comprises a plurality of stacked cells;
   wherein a cell in the cell assembly comprises a cell body and a tab;
   the plurality of fastening bands comprises a first fastening band configured to enclose the cell assembly in a thickness direction of the cell and a second fastening band configured to enclose the cell assembly in the thickness direction of the cell;
   wherein, in a length direction of the cell, a distance between a projection location of the first fastening band on the cell body and a first end of the cell body is greater than or equal to 2L/25 and less than or equal to L/4, a distance between a projection location of the second fastening band on the cell body and a second end of the cell body is greater than or equal to 2L/25 and less than or equal to L/4, L is a length of the cell body, and
   a housing, wherein the housing comprises a casing and an end plate, the casing contains the cell assembly, the end plate is provided on an outer surface of the casing;
   wherein in a stacking direction of the cells, the end plate is between the plurality of fastening bands and the casing;
   wherein the casing further comprises a third surface and a fourth surface facing away from each other, wherein the end plate is in contact with the third surface; and the casing further comprises at least one accommodating groove, wherein the at least one accommodating groove is formed on the third surface and formed by recessing the third surface toward the inside of the casing, and the end plate is entirely seated within the at least one accommodating groove;
   wherein the casing is provided between the plurality of fastening bands and the cell assembly;
   wherein each fastening band comprises at least one pressure adjustment unit, wherein the at least one pressure adjustment unit is configured to adjust a pressure applied by each fastening band to the casing; and
   wherein the at least one pressure adjustment unit comprises a bolt and a nut, wherein a torque applied to the bolt is greater than or equal to 1.5 NM and less than or equal to 50 NM.

2. The battery module according to claim 1, wherein the end plate is provided between an outermost cell of the cell assembly and the plurality of fastening bands in the stacking direction of the cell.

3. The battery module according to claim 1, wherein grooves are provided on an outer surface of the casing, wherein the casing comprises a first surface and a second surface facing away from each other, and the grooves are formed on the first surface and the second surface.

4. The battery module according to claim 3, wherein the plurality of fastening bands are provided in the grooves.

5. The battery module according to claim 4, wherein the plurality of fastening bands are two, the two fastening bands are spaced apart from each other; and the grooves comprise a first sub-groove, a second sub-groove, a third sub-groove and a fourth sub-groove; wherein the first sub-groove and the third sub-groove are formed on the first surface, the second sub-groove and the fourth sub-groove are formed on the second surface, one of the fastening bands is provided in the first sub-groove and the second sub-groove, and the other fastening band is provided in the third sub-groove and the fourth sub-groove.

6. The battery module according to claim 1, wherein the end plate is provided between an outermost cell of the cell assembly and the plurality of fastening bands in the stacking direction of the cell.

7. The battery module according to claim 1, wherein the casing further comprises a first sub-casing and a second sub-casing, wherein the first sub-casing and the second sub-casing are buckled to form the casing, a first surface is provided on the first sub-casing, and a second surface is provided on the second sub-casing; the casing further comprises a fifth surface and a sixth surface, wherein a buckling face of the first sub-casing and the second sub-casing separates the third surface, the fourth surface, the fifth surface, and the sixth surface; and the at least one accommodating groove comprises a first branch groove and a second branch groove, wherein the first branch groove is provided on the first sub-casing and the second branch groove is provided on the second sub-casing.

8. The battery module according to claim 1, wherein a value of the pressure applied by each fastening bands to the casing is in a range of greater than 0 kgf/cm$^2$ to 100 kgf/cm$^2$.

9. The battery module according to claim 1, wherein a sum of areas of cross-sections of the plurality of fastening bands is greater than or equal to 60 mm$^2$.

10. The battery module according to claim 6, wherein the housing further comprises a front cover and a control circuit, wherein the front cover is buckled at an end of the casing, and the control circuit is provided between the end plate and the front cover.

11. The battery module according to claim 1, wherein an installation groove is provided inside the casing, and at least a part of the cell assembly is provided in the installation groove.

12. The battery module according to claim 11, wherein a plurality of installation grooves are provided inside the casing, and one cell body is provided in one installation groove.

13. The battery module according to claim 1, wherein each cell of the plurality of stacked cells comprises a plate-shaped cell body and a tab, and a plurality of cell bodies are stacked in a thickness direction of the cell body.

14. A battery module, comprising:
   a cell assembly and a plurality of fastening bands, the cell assembly comprises a plurality of stacked cells;
   wherein a cell in the cell assembly comprises a cell body and a tab;
   the plurality of fastening bands comprises a first fastening band configured to enclose the cell assembly in a thickness direction of the cell and a second fastening band configured to enclose the cell assembly in the thickness direction of the cell;

wherein, in a length direction of the cell, a distance between a projection location of the first fastening band on the cell body and a first end of the cell body is greater than or equal to 2L/25 and less than or equal to L/4, a distance between a projection location of the second fastening band on the cell body and a second end of the cell body is greater than or equal to 2L/25 and less than or equal to L/4, L is a length of the cell body, and a housing, wherein the housing comprises a casing and an end plate, the casing contains the cell assembly, the end plate is provided on an outer surface of the casing;

wherein in a stacking direction of the cells, the end plate is between the plurality of fastening bands and the casing;

wherein the casing further comprises a third surface and a fourth surface facing away from each other, wherein the end plate is in contact with the third surface; and the casing further comprises at least one accommodating groove, wherein the at least one accommodating groove is formed on the third surface and formed by recessing the third surface toward the inside of the casing, and the end plate is entirely seated within the at least one accommodating groove;

wherein the casing is provided between the plurality of fastening bands and the cell assembly;

wherein the plurality of fastening bands comprises at least one pressure adjustment unit, wherein the at least one pressure adjustment unit is configured to adjust a pressure applied by the plurality of fastening bands to the casing; and wherein the plurality of fastening bands are strip-shaped, each fastening band comprises a first adjustment portion and a second adjustment portion spaced apart from each other, the at least one pressure adjustment unit is in adjustable connection with the first adjustment portion and the second adjustment portion, and the at least one pressure adjustment unit adjusts the pressure applied by the fastening band to the casing by adjusting a distance between the first adjustment portion and the second adjustment portion, a torque provided by the at least one pressure adjustment unit to the plurality of fastening bands is in a range of 1.5 NM to 50 NM.

* * * * *